June 19, 1951 — B. FISK ET AL — 2,557,085
ELECTRONIC SWITCH
Filed Feb. 27, 1948
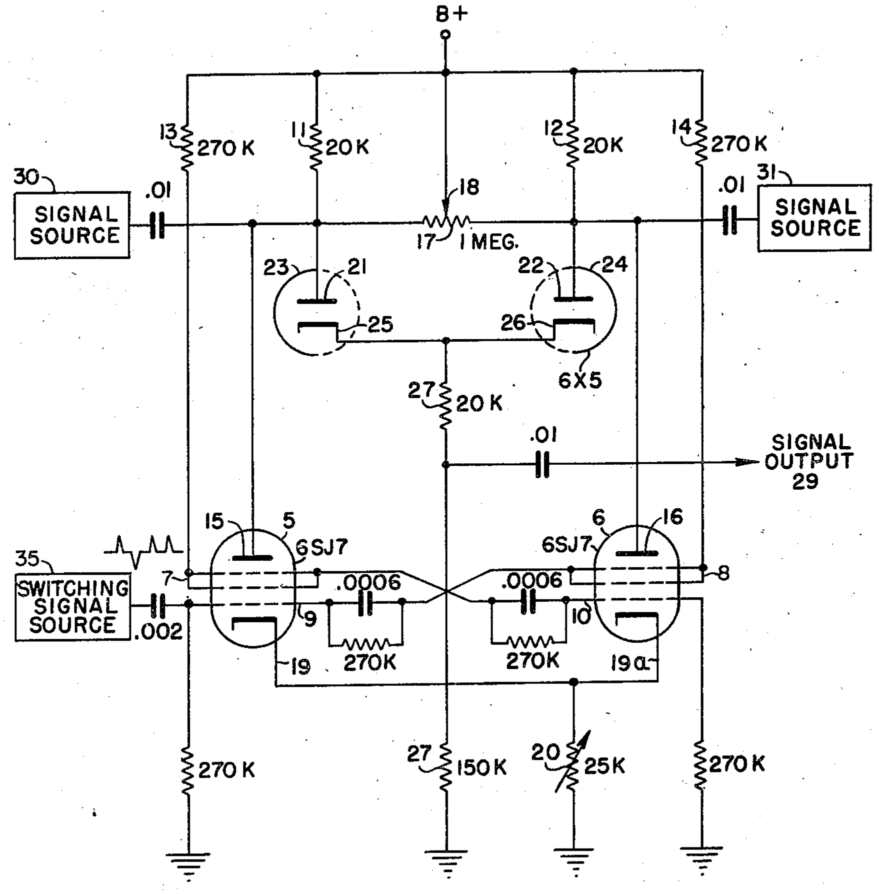
INVENTORS
BERT FISK
CHARLES L. SPENCER
BY N. J. Horsfield
ATTORNEY Patented June 19, 1951

2,557,085

UNITED STATES PATENT OFFICE 2,557,085

ELECTRONIC SWITCH

Bert Fisk and Charles L. Spencer,
Washington, D. C.

Application February 27, 1948, Serial No. 11,762

6 Claims. (Cl. 250—27)

This invention relates generally to electronic switches, and more particularly to an electronic signal switching means having a balanced output.

The use of gated amplifiers for coupling and decoupling a signal source is well known in the prior art, and the gating signal is likely to be supplied by a multivibrator. However, in conventional circuits the gating signal appears to a noticeable degree in the amplifier output, producing a varying or unbalanced output. Also, the signal source must be isolated from the gate producing multivibrator in order to not affect the multivibrator action. Such known circuits generally employ a multi-grid coincidence circuit for combining the gate and the signal. This arrangement cannot properly pass the signal without also passing part of the gate. In many applications, such as the transmission of facsimile signals, the presence of the gating signal in the output is very undesirable. Traces of the gating voltage may be confused with the signal voltage and render the circuit ineffective.

In some applications it may be desirable to alternately switch a pair of signals to a single circuit. This cannot be accomplished by prior art systems without additional apparatus.

It is therefore an object of this invention to provide an electronically controlled switching circuit having a balanced output.

It is another object of this invention to provide a signal controlled switching circuit having an output voltage which is unaltered by the switching signal or the switching action.

It is another object of this invention to provide a signal controlled signal selector circuit having an output which is unaltered by the control signal or the selector action.

It is another object of this invention to provide a single pole double throw switching circuit which may be actuated by an external signal and which has a balanced output.

Other objects and advantages of the invention will be apparent from the following description and accompanying drawing.

The single figure of the drawing is a schematic diagram of a preferred embodiment of this invention.

Briefly, this invention employs a pair of unilateral impedances connected to a multivibrator in a full-wave rectifier arrangement. The multivibrator may be any type of regenerative amplifier suitable to deliver two square waves in phase opposition. Therefore, conduction is alternated between the rectifier elements in response to the multivibrator action but the rectifier output remains constant. Consequently, a signal source connected to either input of the rectifier will appear at the rectifier output when its particular rectifier element is rendered conducting by the multivibrator.

Referring now in detail to the drawing, it will be seen that a pair of pentodes, 5 and 6, are used in a cathode coupled multivibrator circuit. The screen and suppresser grids, 7 of tube 5 and 8 of tube 6, are tied together. The grids 7 of tube 5 are resistance-capacitance coupled to the control grid 10 of tube 6 and the grids 8 of tube 6 are similarly coupled to the control grid 9 of tube 5 to effect the multivibrator action. The respective grids 7 and 8 are tied to B+ through a pair of resistances 13 and 14 and serve as anodes for the multivibrator circuit. The respective plates 15 and 16 of each tube 5 and 6 are tied to B+ through resistances 11 and 12. Therefore signals proportionate to those produced by the multivibrator action will appear at plates 15 and 16.

The preferred embodiment shown in the drawing is a regenerative amplifier of the driven type. Only one tube will conduct at a time and the conducting status of the tubes will be interchanged only upon the introduction of an external signal, such as the introduction of a signal from source 35 to control grid 9 of tube 5. A positive signal from source 35 will render tube 5 conducting, tube 5 will then remain conducting until an adequate negative signal is impressed on its grid 9. Whereupon tube 6 will become conducting until an adequate positive signal is applied to grid 9 of tube 5. It will be apparent that many other arrangements could be used, as for example a free running multivibrator. The type selected will be determined by the type of switching control desired.

The control grids 9 and 10 and the cathodes 19 and 19*a* are returned to ground through resistance paths. The cathodes 19 have a common resistance path to ground through the biasing resistance 20. Resistance 20 is preferably made variable as a means of controlling the cathode bias, since it may be desired to vary the bias of tubes 5 and 6 to insure positive triggering thereof in response to the control signal from source 35.

The plates 15 and 16 are direct coupled to plates 21 and 22 respectively of a pair of diodes 23 and 24. The respective cathodes 25 and 26 of said diodes are tied together and to ground through a resistance path 27.

In operation it will be seen that when tube 5 is conducting and tube 6 is cut off, plate 15 will be at a lower potential than plate 16 but both potentials will be above ground. Therefore plate 22 of diode 24 will be at a higher potential than plate 21 of diode 23. Both diode plates are initially at a higher potential than their cathodes but only diode 24 will conduct since its cathode 26 will rise to substantially the potential of its plate 22, thus bringing cathode 25 to the potential of plate 22. Therefore, in the other diode 23 the cathode 25 is at a higher potential than its plate 21 and said diode 23 will not be conducting. Conversely, when conduction is reversed in the multivibrator, tube 6 will become conducting and its plate 16 will be at a lower potential than plate 15 of tube 5 which will be cut off. Accordingly, diode plate 22 will be lower than diode plate 21, cathodes 25 and 26 will rise to the potential of plate 21 and diode 23 will conduct and diode 24 will cut off.

Since tube 5 is nonconducting when tube 6 is conducting, it would appear that plate 15 would then be at B+ potential. However, when plate 15 of tube 5 is more positive than plate 16 of tube 6, diode 23 becomes conducting and a direct current path is completed between B+ and ground through resistance 11, diode 23, and resistance 27. As a result there will occur a small voltage drop across the plate load resistance 11 and plate 15 will drop to a potential somewhat below B+ although still much higher than plate 16. Similarly, when tube 5 is conducting and tube 6 is cut off, current will flow through plate resistance 12, diode 24, and resistance 27. The current passed by diode 23 when it conducts must equal that passed by diode 24 when it conducts in order to maintain a constant output voltage across resistance 27. Differences between resistances 11 and 12 or between diodes 23 and 24 would cause the output voltage to vary as conduction alternates between the diodes. To avoid this a potentiometer 17 is tied between the diode plates 21 and 22 and a variable tap 18 on the potentiometer is tied to B+. By varying tap 18 the output voltage may be balanced to overcome mismatched components and it becomes unnecessary to choose perfectly matched tubes or load resistors or replace same because of variations occurring during their normal life.

A signal source 30 or 31 may be coupled to one of the diode plates 21 and 22 or each may be coupled respectively to one of said plates as shown in the drawing. The signal from source 30 or 31 will appear at the diode cathodes 25 and 26 whenever the diode to whose plate it is connected is conducting. The signal passed by the conducting diode will develop across resistance 27 and may be taken from the diode cathodes or from an intermediate point in resistance 27 as indicated by signal output 29 in the drawing.

The peak amplitude of signals from any signal source 30 or 31 applied to either diode plate should not exceed the potential difference between the electrodes of a nonconducting diode, otherwise the off condition of the switching circuit will not be completely effective. This requirement may be provided for by attenuation of the signal source or in the selection of the multivibrator circuit, since the potential difference between the nonconducting diode electrodes is equivalent to the potential difference between the multivibrator plates 15 and 16.

Although only a specific embodiment of this invention has been shown and described, it is to be understood that same is merely illustrative of this invention and modifications may, of course, be made without departing from the spirit and scope of the invention as defined in the appended claims. For example, a free running multivibrator may be used and the switching signal source eliminated. The circuit disclosed is adequate for coupling and decoupling one signal source, or for alternately selecting between two signal sources, and it will be apparent that it could easily be expanded to select among a plurality of signal sources by employing a plurality of multivibrator circuits in a counter circuit arrangement in cooperation with a plurality of rectifier elements.

The invention described herein may be manufactured and used by or for the Government of the United States of America for governmental purposes without the payment of any royalties thereon or therefor.

What is claimed is:

1. An electronic switch comprising, a unidirectional conducting device having two similarly unidirectional paths of conduction, a separate signal input terminal and a common output terminal associated with each of said paths, an output load resistance for said output terminal, a switching device having a pair of output terminals operative to deliver phase opposed switching potentials, and similar direct current connecting means connecting each of said input terminals to a respective output terminal on said switching device whereby said paths of conduction are blocked in alternation.

2. An electronic switch comprising, a unidirectional conducting device having two similarly unidirectional paths of conduction, a separate signal input terminal and a common output terminal associated with each of said paths, an output load resistance for said output terminal, a two tube regenerative amplifier having a pair of output terminals operative to deliver phase opposed square wave potentials, and similar direct current connecting means connecting each of said input terminals to a respective output terminal on said regenerative amplifier whereby said paths of conduction are blocked in alternation.

3. An electronic switch comprising, a unidirectional conducting device having two similarly unidirectional paths of conduction, a separate signal input terminal and a common output terminal associated with each of said paths, an output load resistance for said output terminal, a two tube regenerative amplifier having a pair of output terminals operative to deliver phase opposed square wave potentials, and means connecting each of said input terminals to a respective output terminal on said regenerative amplifier whereby said paths of conduction are blocked in alternation, and means for balancing the current alternately flowing in said paths of conduction.

4. An electronic switch comprising, a unidirectional conducting device having two similarly unidirectional paths of conduction, a separate signal input terminal and a common output terminal associated with each of said paths, an output load resistance for said output terminal, a regenerative amplifier having two tubes which alternate conduction in response to an external signal, an output terminal for each of said tubes operative to deliver phase opposed square wave potentials, similar direct current connecting means connecting each of said input terminals to a respective output terminal on said regenerative amplifier, a source of switching signals for alternating conduction in said regenerative amplifier whereby said paths of conduction are blocked in alternation, and means for balancing the current alternately flowing in said paths of conduction.

5. An electronic switch comprising, a unidirectional conducting device having two similarly unidirectional paths of conduction, a separate signal input terminal and a common output terminal associated with each of said paths, an output load resistance for said output terminal, a regenerative amplifier including a pair of multi-element vacuum tubes each having at least a cathode, an anode, a first grid and a second grid, each first grid being regeneratively coupled to the second grid of the other tube, said amplifier being operative to deliver phase opposed square wave potentials at its anodes, similar direct current connecting means connecting each of said input terminals to a respective anode of said regenerative amplifier whereby said paths of conduction are blocked in alternation, and means for balancing the current alternately flowing in said paths of conduction.

6. An electronic switch comprising, a first thermionic vacuum tube having at least one cathode and two anodes, an output load resistance connected to said cathode, a regenerative amplifier including a pair of multi-element vacuum tubes each having at least a cathode, an anode, a first grid and a second grid, each first grid being regeneratively coupled to the second grid, of the other tube, said amplifier being operative to deliver phase opposed square wave potentials at its anodes, similar direct current connecting means connecting each of the anodes of said first tube to a respective anode of said regenerative amplifier whereby said first tube's anodes are alternately biased at a lower potential than said first tube's cathode, and a resistance interconnecting said last named anodes, said resistance having a variable tap connected to a positive potential and operative to balance the current alternately flowing in said first tube.

BERT FISK.
CHARLES L. SPENCER.

REFERENCES CITED

The following references are of record in the file of this patent:

UNITED STATES PATENTS

| Number | Name | Date |
|---|---|---|
| 2,258,943 | Bedford | Oct. 14, 1941 |
| 2,324,314 | Michel | July 13, 1943 |
| 2,436,482 | Miller et al. | Feb. 24, 1948 |
| 2,441,246 | Miller et al. | May 11, 1948 |